(12) United States Patent
Hori et al.

(10) Patent No.: US 6,310,761 B1
(45) Date of Patent: Oct. 30, 2001

(54) DIELECTRIC CERAMIC COMPOSITION AND MONOLITHIC CERAMIC CAPACITOR

(75) Inventors: Kenji Hori, Shiga-ken; Kotaro Hata, Kyoto; Toshihiro Ikamatsu, Moriyama; Tomoyuki Nakamura, Shiga-ken; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/655,071

(22) Filed: Sep. 5, 2000

(30) Foreign Application Priority Data

Sep. 3, 1999 (JP) .................................................. 11-250250
Jul. 21, 2000 (JP) .................................................. 12-221102

(51) Int. Cl.$^7$ ................................. H01G 4/06; H01G 4/30
(52) U.S. Cl. ...................................... 361/321.2; 361/321.4
(58) Field of Search ............ 361/311–313, 321.1–321.5, 361/322; 501/134, 136, 137, 139

(56) References Cited

U.S. PATENT DOCUMENTS 5,335,139 * 8/1994 Nomura et al. .................... 361/321.4
5,668,694 * 9/1997 Sato et al. ......................... 361/321.4

* cited by examiner

Primary Examiner—Anthony Dinkins
(74) Attorney, Agent, or Firm—Ostrolenk, Faber, Gerb & Soffen, LLP

(57) ABSTRACT

A dielectric ceramic composition is composed of barium titanate ($Ba_mTiO_3$), a rare-earth oxide ($RO_{3/2}$), where the rare-earth element is at least one of Y, Sm, Eu, Gd, Tb, Dy, Ho, Er, Tm and Yb, calcium oxide and a silicon oxide. When the dielectric ceramic composition is represented by the formula $100Ba_mTiO_3+aRO_{3/2}+bCaO+cSiO_2$, where coefficients 100, a, b, and c indicate moles, the relationships $0.990 \leq m \leq 1.030$, $0.5 \leq a \leq 30$, $0.5 \leq b \leq 30$, and $0.5 \leq c \leq 30$ are satisfied. A monolithic ceramic capacitor includes a plurality of dielectric ceramic layers, internal electrodes formed between the dielectric ceramic layers and external electrodes electrically connected to the internal electrodes. The dielectric ceramic layers are composed of the dielectric ceramic composition described above, and the internal electrodes are composed of a base metal as a principal constituent.

20 Claims, 1 Drawing Sheet

DIELECTRIC CERAMIC COMPOSITION AND MONOLITHIC CERAMIC CAPACITOR

BACKGROUND OF THE INVENTION

1. Field of the Invention

The present invention relates to a dielectric ceramic composition and a monolithic ceramic capacitor using the same.

2. Description of the Related Art

A conventional monolithic ceramic capacitor is usually fabricated in a method described below.

First, prepared are a plurality of sheets composed of a dielectric material in which the surface of each sheet is coated with an electrode material for forming an internal electrode. As the dielectric material, for example, a material containing $BaTiO_3$ as a principal constituent is used. The plurality of sheets, each coated with the electrode material, are laminated and subjected to thermal compression, and the resulting compact is fired, and thus a dielectric ceramic provided with internal electrodes is obtained. By fixing and baking external electrodes that electrically connect to the internal electrodes on the sides of the dielectric ceramic, a monolithic ceramic capacitor is obtained.

As materials for the internal electrodes, noble metals, such as platinum, gold, palladium and silver-palladium alloys, which are not oxidized even if fired simultaneously with the dielectric material, have been used. However, although such materials for the internal electrodes have superior characteristics, they are very expensive, resulting in an increase in fabrication cost of monolithic ceramic capacitors.

Consequently, base metals, such as nickel and copper, which are relatively inexpensive have been used as the materials for the internal electrodes. However, the base metals are easily oxidized in high-temperature, oxidizing atmospheres, which ruins the function as the internal electrodes. In order to use the base metals as the materials for the internal electrodes, firing must be performed in a neutral or reducing atmosphere together with dielectric ceramic layers. However, if firing is performed in such a neural or reducing atmosphere, the dielectric ceramic layers are reduced and become semiconductive.

In order to overcome the drawbacks described above, for example, Japanese Examined Patent Application Publication No. 57-42588 discloses a dielectric ceramic composition in which the ratio of the barium site to the titanium site is in excess of the stoichiometric ratio in a barium titanate solid solution, and Japanese Unexamined Patent Application Publication No. 61-101459 discloses a dielectric ceramic composition in which an oxide of a rare-earth element, such as La, Nd, Sm, Dy or Y, is added to a barium titanate solid solution.

As the dielectric ceramic composition in which a change in dielectric constant with temperature is decreased, for example, Japanese Unexamined Patent Application Publication No. 62-256422 discloses a $BaTiO_3$—$CaZrO_3$—MnO—MgO-based dielectric ceramic composition, and Japanese Examined Patent Application Publication No. 61-14611 discloses a $BaTiO_3$—(Mg, Zn, Sr, Ca)O—$B_2O_3$—$SiO_2$-based dielectric ceramic composition.

By using such dielectric ceramic compositions, dielectric ceramics which do not become semiconductive even if fired in a reducing atmosphere are obtained, and it is possible to fabricate monolithic ceramic capacitors which use base metals, such as nickel, as internal electrodes.

With the recent development in electronics, electronic components are being rapidly miniaturized. Accordingly, monolithic ceramic capacitors are also miniaturized and the capacitance thereof is increasing. Therefore, there is a great demand for a dielectric ceramic composition having a high dielectric constant, in which a change in dielectric constant with temperature is decreased, and having high insulating properties even if formed into thin films, thus being highly reliable.

However, since the conventional dielectric ceramic compositions are designed for use at low electric field intensity, when they are used for thin films, i.e., at high electric field intensity, the insulation resistance, the dielectric strength and the reliability are significantly decreased. Therefore, with respect to the conventional dielectric ceramic compositions, when the thickness of ceramic dielectric layers is reduced, the rated voltage must be decreased in response to the reduced thickness.

Specifically, with respect to the dielectric ceramic compositions disclosed in Japanese Examined Patent Application Publication No. 57-42588 and Japanese Unexamined Patent Application Publication No. 61-101459, although a large dielectric constant is obtained, the size of resulting crystal grains is increased. When the thickness of dielectric ceramic layers in a monolithic ceramic capacitor is reduced to 10 μm or less, the number of crystal grains in each layer is decreased, resulting in a decrease in reliability. Additionally, the change in dielectric constant with temperature is increased. Thus, the dielectric ceramic compositions described above do not sufficiently meet the requirements of the market.

With respect to the dielectric ceramic composition disclosed in Japanese Unexamined Patent Application Publication No. 62-256422, the dielectric constant is relatively high, the size of crystal grains of a resulting ceramic laminate is decreased, and the change in dielectric constant with temperature is decreased. However, $CaZrO_3$ and $CaTiO_3$ which are formed during firing easily form a secondary phase with MnO, etc., giving rise to a problem in reliability, in particular, at high temperatures when the thickness of the layers is reduced.

The dielectric ceramic composition disclosed in Japanese Examined Patent Application Publication No. 61-14611 does not satisfy the X7R characteristic stipulated in the EIA standard, that is, the rate of change in capacitance in the temperature range from −55 to +125° C. being within 15%.

In order to overcome the problems described above, Japanese Unexamined Patent Application Publication Nos. 5-9066, 5-9057, and 5-9068 disclose $BaTiO_3$—$Re_2O_3$—$Co_2O_3$-based compositions (where Re is a rare-earth element). However, such compositions also cannot sufficiently meet the requirements of the market with respect to the reliability when the thickness of dielectric ceramic layers is reduced.

SUMMARY OF THE INVENTION

Accordingly, it is an object of the present invention to provide a dielectric ceramic composition for constituting dielectric ceramic layers in a monolithic ceramic capacitor, in which the change in capacitance with temperature satisfies the B-level characteristic stipulated in the Japanese Industrial Standard (JIS) and the X7R-level characteristic stipulated in the EIA standard, the dielectric loss is as low as about 2.5% or less, and the product of insulation resistance (R) and capacitance (C), i.e., the product CR, at room temperature in the presence of an applied DC electric field of 4 kV/mm is 10,000 Ω·F or more, and which is highly reliable even if the thickness of the layers is reduced because the insulation resistance has a long acceleration life at high temperatures and high voltages. It is another object of the present invention to provide a monolithic ceramic capacitor in which such a dielectric ceramic composition is used for the dielectric ceramic layers and the internal electrodes are composed of a base metal.

In accordance with the present invention, a dielectric ceramic composition is composed of barium titanate ($Ba_mTiO_3$), a rare-earth oxide ($RO_{3/2}$) where the rare-earth element R is at least one element selected from the group consisting of Y, Sm, Eu, Gd, Tb, Dy, Ho, Er, Tm and Yb, calcium oxide (CaO), and a silicon oxide ($SiO_2$). When the dielectric ceramic composition is represented by the formula $100Ba_mTiO_3 + aRO_{3/2} + bCaO + cSiO_2$, and coefficients 100, a, b, and c indicate moles, m, a, b, and c satisfy the relationships $0.990 \leq m \leq 1.030$, $0.5 \leq a \leq 30$, $0.5 \leq b \leq 30$, and $0.5 \leq c \leq 30$, respectively.

Preferably, the composition further contains an oxide, as a sintering additive, containing at least one element selected from the group consisting of B and Si as a principal constituent, the content of the oxide being about 15 parts by weight or less relative to 100 parts by weight of $Ba_mTiO_3$.

Preferably, the composition further contains a compound, as a secondary constituent, containing at least one element M selected from the group consisting of Mn, Zn, Ni, Co and Cu, the content of the compound converted into MO being about 5.0 moles or less.

Preferably, the composition further contains a compound, as a secondary constituent, containing at least one element X selected from the group consisting of Ba, Ca and Sr and at least one element Y selected from the group consisting of Zr and Hf, the content of the compound converted into $XYO_3$ being about 30 moles or less.

In accordance with the present invention, a monolithic ceramic capacitor includes a plurality of dielectric ceramic layers, internal electrodes formed between the dielectric ceramic layers and external electrodes electrically connected to the internal electrodes. The dielectric ceramic layers are composed of the dielectric ceramic composition described above, and the internal electrodes are composed of a base metal as a principal constituent.

DESCRIPTION OF THE PREFERRED EMBODIMENTS

Figure 1:
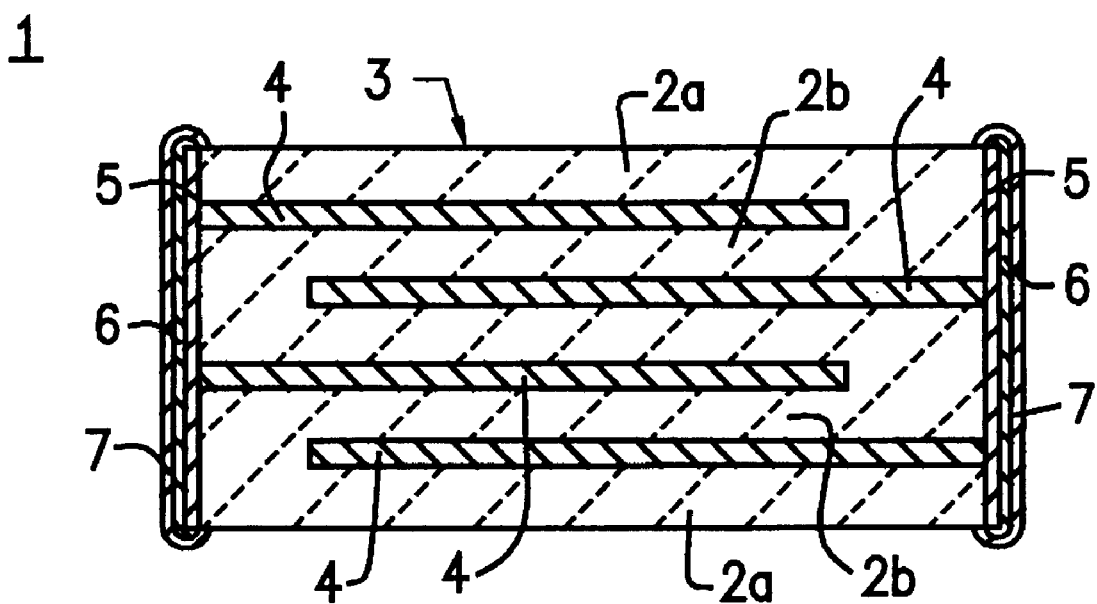
FIG. 1 is a sectional view of a monolithic ceramic capacitor in an embodiment of the present invention.

First, the structure of a monolithic ceramic capacitor in an embodiment of the present invention will be described with reference to the drawing. FIG. 1 is a sectional view of a monolithic ceramic capacitor.

As shown in FIG. 1, a monolithic ceramic capacitor 1 includes a ceramic laminate 3, which is a rectangular parallelepiped, obtained by laminating a plurality of dielectric ceramic layers 2a and 2b with internal electrodes 4 therebetween. An external electrode 5 is formed on each side of the ceramic laminate 3 so as to be electrically connected to specific internal electrodes 4. A first plating layer 6 composed of nickel, copper or the like is formed on the external electrode 5, and a second plating layer 7 composed of solder, tin or the like is further formed thereon.

The dielectric ceramic layers 2a and 2b are composed of a dielectric ceramic composition of the present invention, that is, a compound oxide containing barium titanate, a rare-earth oxide, where the rare-earth element is at least one element selected from the group consisting of Y, Sm, Eu, Gd, Tb, Dy, Ho, Er, Tm and Yb, calcium oxide, and a silicon oxide. When the dielectric ceramic composition is represented by the formula $100Ba_mTiO_3 + aRO_{3/2} + bCaO + cSiO_2$, where $Ba_mTiO_3$ is the barium titanate, $RO_{3/2}$ is the rare-earth oxide, where R is the rare-earth element, CaO is the calcium oxide, $SiO_2$ is the silicon oxide, and coefficients 100, a, b, and c indicate moles, the relationships $0.990 \leq m \leq 1.030$, $0.5 \leq a \leq 30$, $0.5 \leq b \leq 30$, and $0.5 \leq c \leq 30$ are satisfied.

Preferably, the composition further contains certain amounts of at least one material, as a secondary constituent, selected from the group consisting of 1) an oxide, as a sintering additive, containing at least one element selected from the group consisting of B and Si, 2) a compound containing at least one element selected from the group consisting of Mn, Zn, Ni, Co and Cu, and 3) a compound containing at least one element selected from the group consisting of Ba, Ca and Sr and at least one element selected from the group consisting of Zr and Hf.

By using such a dielectric ceramic composition for the dielectric ceramic layers 2a and 2b, a monolithic ceramic capacitor can be obtained in which characteristics are not deteriorated even if firing is performed in a reducing atmosphere, the change in capacitance with temperature satisfies the B-level characteristic stipulated in the JIS and the X7R-level characteristic stipulated in the EIA standard, the dielectric loss is as low as 2.5% or less, and the product of insulation resistance (R) and capacitance (C), i.e., the product CR, at room temperature in the presence of an applied DC electric field of 4 kV/mm is 10,000 Ω·F or more, and which is highly reliable even if the thickness of the layers is reduced because of a long acceleration life at high temperatures and high voltages.

As the material for the internal electrodes of the monolithic ceramic capacitor, a base metal, such as nickel, a nickel alloy, copper or a copper alloy, may be used appropriately. It is also possible to add a small amount of ceramic powder to the material for the internal electrodes in order to prevent structural defects.

The external electrodes may be composed of a sintered layer comprising a conductive metal powder of silver, palladium, a silver-palladium alloy, copper, a copper alloy, etc., or a sintered layer comprising the conductive metal powder combined with glass frit, such as $B_2O_3$—$Li_2O$—$SiO_2$—BaO-based glass, $B_2O_3$—$SiO_2$—BaO-based glass, $Li_2O$—$SiO_2$—BaO-based glass or $B_2O_3$—$SiO_2$—ZnO-based glass. Although a plating layer composed of nickel, copper or the like is usually formed on the external electrodes composed of the sintered layer, the plating layer may be omitted depending on the application of the monolithic ceramic capacitor.

EXAMPLE 1

First, as starting materials, $TiCl_4$ and $Ba(NO_3)_2$ were prepared and weighed, and an aqueous solution was formed. By adding oxalic acid, titanyl barium oxalate {$BaTiO(C_2O_4) \cdot 4H_2O$} was precipitated. By heating the precipitate at 1,000° C. or more, barium titanate ($BaTiO_3$) as the principal constituent was formed. As the rare-earth oxide ($RO_{3/2}$), $Y_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$ and $Yb_2O_3$ were prepared, as the calcium oxide, CaO was prepared, and as magnesium oxide, MgO was prepared.

The above powdered raw materials were mixed so as to satisfy the compositions shown in Table 1 below (excluding the $SiO_2$), and calcination was performed at 900 to 1,100° C. Pulverization was then performed so that the maximum particle size was 1 μm or less.

Next, as the silicon oxide, $SiO_2$ was prepared, and the $SiO_2$ and the calcines previously obtained were weighed and mixed so as to satisfy the compositions shown in Table 1. A polyvinyl butyral-based binder and an organic solvent, such as ethanol, were added to the mixtures, followed by wet mixing using a ball mill, to prepare ceramic slurries. The ceramic slurries were formed into sheets by a doctor blade process to obtain green sheets.

TABLE 1

Composition: $100BaTiO_3$-$aRO_{3/2}$-$bCaO$-$cSiO_2$

| Sample No. | aRO$_{3/2}$ | | | | | Total a | CaO b | SiO$_2$ c | Other Constituents |
|---|---|---|---|---|---|---|---|---|---|
| | R | a | R | a | R | a | | | |
| *1 | Tb | 0.2 | Yb | 0.1 | — | 0.3 | 10.0 | 10.0 | — |
| *2 | Er | 21.0 | Eu | 4.0 | Ho | 6.0 | 31.0 | 10.0 | 5.0 | — |
| *3 | Dy | 2.0 | Ho | 0.5 | — | 3.0 | 0.3 | 3.0 | — |
| *4 | Y | 1.0 | Sm | 3.0 | — | 4.0 | 31.0 | 4.0 | — |
| *5 | Yb | 15.0 | — | — | 15.0 | 2.0 | 0.3 | — |
| *6 | Er | 10.0 | — | — | 10.0 | 12.0 | 32.0 | — |
| 7 | Gd | 0.5 | — | — | 0.5 | 5.0 | 3.0 | — |
| 8 | Dy | 30.0 | — | — | 30.0 | 10.0 | 25.0 | — |
| 9 | Tm | 2.0 | Tb | 1.0 | — | 3.0 | 0.5 | 1.0 | — |
| 10 | Ho | 2.0 | Eu | 4.0 | — | 6.0 | 30.0 | 15.0 | — |
| 11 | Sm | 1.0 | Dy | 0.5 | Y | 0.5 | 2.0 | 3.0 | 0.5 | — |
| 12 | Tm | 15.0 | Yb | 5.0 | — | 20.0 | 12.0 | 30.0 | — |
| 13 | Y | 10.0 | Ho | 10.0 | — | 20.0 | 10.0 | 10.0 | — |
| 14 | Er | 2.0 | — | — | 2.0 | 5.0 | 4.0 | — |
| 15 | Tb | 3.0 | Er | 1.0 | — | 4.0 | 4.0 | 6.0 | — |
| 16 | Gd | 3.0 | — | — | 3.0 | 3.0 | 5.0 | — |
| *40 | Y | 10.0 | Ho | 10.0 | — | 20.0 | 10.0 | 10.0 | MgO 2.0 moles |

With respect to each sample shown in Table 1, a conductive paste containing nickel as a principal constituent was screen-printed on the ceramic green sheets to form conductive paste layers for forming internal electrodes. A plurality of the ceramic green sheets provided with the conductive paste layers were laminated in such a manner that the edges at which the conductive paste layers were exposed alternately at opposed sides of the laminate to be formed. The resulting laminate was heated at 350° C. in an $N_2$ atmosphere to remove the binder, and then firing was performed for 2 hours at the temperature shown in Table 2 in a reducing atmosphere comprising gases of $H_2$, $N_2$ and $H_2O$ having an oxygen partial pressure of $10^{-9}$ to $10^{-12}$ MPa to obtain a ceramic sintered compact.

A silver paste containing $B_2O_3$—$Li_2O$—$SiO_2$—$BaO$-based glass frit was applied to both sides of the sintered compact, and baking was performed at 600° C. in an $N_2$ atmosphere, and thus external electrodes which were electrically connected to the internal electrodes were formed.

In the individual samples, the monolithic capacitors obtained as described above had outer dimensions in which the width was 1.6 mm, the length was 3.2 mm and the thickness was 1.2 mm, and the dielectric ceramic layers disposed between the internal electrodes had a thickness of 5 μm. The total number of the effective ceramic dielectric layers was 100, and the area of the counter electrode per layer was 2.1 mm$^2$.

Next, with respect to the monolithic ceramic capacitors obtained, electrical characteristics were evaluated. That is, the capacitance (C) and the dielectric loss (tan δ) were measured at a frequency of 1 kHz, 1 $V_{rms}$ and 25° C., and the relative dielectric constant (ε) was computed based on the capacitance measured. Next, the insulation resistance at an electric field of 4 kV/mm was measured by applying a DC voltage of 20 V for 2 minutes, and the product of the capacitance (C) and the insulation resistance (R), i.e., the product CR, was obtained.

The rate of change in capacitance with temperature was also measured. The rates at −25° C. and 85° C. based on the capacitance at 20° C. (ΔC/C$_{20}$) and the rates at −55° C. and 125° C. based on the capacitance at 25° C. (ΔC/C$_{25}$) were obtained.

The high-temperature load test was also carried out, in which the change of the insulation resistance with time was measured for 36 pieces for each sample by applying a DC voltage of 100 V at 150° C. so as to maintain an electric field of 20 kV/mm. The point at which the insulation resistance (R) reached 200 kΩ or less was defined as the lifetime, and the average lifetime was calculated.

The evaluation results are shown in Table 2. The sample numbers with asterisks in the table indicate that the samples were out of the range of the present invention, and the rest of the samples were within the range of the present invention.

TABLE 2

| Sample No. | Firing Temperature (° C.) | ε | tan δ (%) | Change in Capacitance with Temperature ΔC/C20 (%) | | Change in Capacitance with Temperature ΔC/C25 (%) | | Product CR (Ω · F) | Average lifetime (h) |
|---|---|---|---|---|---|---|---|---|---|
| | | | | −25° C. | +85° C. | −55° C. | 125° C. | | |
| *1 | 1040 | 3940 | 3.1 | 0.2 | −10.5 | −2.6 | −15.9 | 11200 | 90 |
| *2 | 1380 | 430 | 0.2 | 0.3 | −7.1 | −2.7 | −10.7 | 14300 | 50 |
| *3 | 1200 | 2660 | 1.2 | 0.4 | −6.6 | −2.4 | −9.4 | 13400 | 40 |
| *4 | 1380 | 1020 | 0.6 | 0.5 | −6.8 | −2.5 | −10.2 | 12300 | 80 |
| *5 | 1380 | 610 | 0.4 | −1.0 | −6.7 | −2.3 | −9.4 | 15300 | 60 |
| *6 | 1100 | 680 | 0.4 | −0.9 | −11.0 | −2.2 | −16.1 | 11000 | 50 |
| 7 | 1160 | 3260 | 2.1 | −0.8 | −8.4 | −2.6 | −13.1 | 11000 | 310 |
| 8 | 1280 | 430 | 0.2 | −0.7 | −6.7 | −2.7 | −12.0 | 11800 | 250 |
| 9 | 1220 | 2420 | 1.2 | −0.6 | −6.9 | −2.4 | −10.7 | 14500 | 270 |
| 10 | 1260 | 950 | 0.5 | 0.0 | −6.6 | −2.6 | −12.4 | 10100 | 290 |
| 11 | 1280 | 2740 | 1.2 | 0.1 | −7.1 | −2.7 | −10.8 | 14900 | 260 |
| 12 | 1140 | 510 | 0.3 | 0.2 | −7.1 | −2.3 | −12.5 | 14500 | 280 |
| 13 | 1200 | 590 | 0.3 | 0.3 | −6.6 | −2.2 | −10.3 | 14300 | 340 |

TABLE 2-continued

| Sample No. | Firing Temperature (° C.) | ε | tan δ (%) | Change in Capacitance with Temperature ΔC/C20 (%) | | Change in Capacitance with Temperature ΔC/C25 (%) | | Product CR (Ω·F) | Average lifetime (h) |
|---|---|---|---|---|---|---|---|---|---|
| | | | | −25° C. | +85° C. | −55° C. | 125° C. | | |
| 14 | 1160 | 2410 | 1.2 | 0.4 | −6.8 | −2.5 | −9.5 | 10600 | 390 |
| 15 | 1180 | 2230 | 0.9 | 0.5 | −6.7 | −2.2 | −9.0 | 14500 | 370 |
| 16 | 1160 | 2320 | 1.1 | 0.0 | −7.0 | −2.7 | −9.8 | 11200 | 280 |
| *40 | 1220 | 500 | 0.4 | −0.1 | −6.2 | −2.1 | −9.3 | 10520 | 50 |

As is obvious from Table 2, with respect to the dielectric ceramic compositions which are within the range of the present invention, it is possible to obtain monolithic ceramic capacitors in which the change in capacitance with temperature satisfies the B-level characteristic stipulated in the JIS and the X7R-level characteristic stipulated in the EIA standard, the dielectric loss is as low as 2.5% or less, and the product of insulation resistance (R) and capacitance (C), i.e., the product CR, at room temperature in the presence of an applied DC electric field of 4 kV/mm is 10,000 Ω·F or more.

Next, the reasons for limiting the compositional ranges will be described below.

The amount a of $RO_{3/2}$ is specified to be in the range from about 0.5 to 30 because, as seen in Sample No. 1, when a is less than about 0.5, the change in capacitance with temperature does not satisfy the B-level characteristic and the X7R-level characteristic and also the high-temperature load lifetime is decreased, and as seen in Sample No. 2, when a is greater than about 30, the firing temperature is increased and the high-temperature load lifetime is decreased.

The amount b of CaO is specified to be in the range from about 0.5 to 30 because, as seen in Sample No. 3, when b is less than about 0.5, the high-temperature load lifetime is decreased, and as seen in Sample No. 4, when b is greater than about 30, the sinterability is decreased and the high-temperature load lifetime is decreased.

The amount c of $SiO_2$ is specified to be in the range from about 0.5 to 30 because, as seen in Sample No. 5, when c is less than about 0.5, the sinterability is decreased and the high-temperature load lifetime is decreased, and as seen in Sample No. 6, when c is greater than about 30, the change in capacitance with temperature does not satisfy the B-level characteristic and the X7R-level characteristic and also the high-temperature load lifetime is decreased.

As is clear from the comparison between the Sample Nos. 13 and 40, the dielectric ceramic composition of the present invention which does not contain MgO has a superior high-temperature load lifetime characteristic than that of the composition which contains MgO.

EXAMPLE 2

In a manner similar to that in Example 1, $BaTiO_3$ was prepared. $Gd_2O_3$ and CaO were also prepared. The above powdered raw materials were mixed so as to satisfy the composition represented by the formula $100BaTiO_3$-$3.0GdO_{3/2}$-$3.0CaO$, where the coefficients indicate moles, and calcination was performed at 900 to 1,100° C. Pulverization was then performed so that the maximum particle size was 1 μm or less.

Next, $SiO_2$ was prepared. As sintering additives, an oxide containing B as a principal constituent represented by the formula $0.55B_2O_3$-$0.25Al_2O_3$-$0.03MnO$-$0.17BaO$, where the coefficients indicate molar ratios (hereinafter referred to as a sintering additive 1), an oxide containing Si as a principal constituent represented by the formula $0.25Li_2O$-$0.65(0.30TiO_2\cdot0.70SiO_2)$-$0.10Al_2O_3$, where the coefficients indicate molar ratios (hereinafter referred to as a sintering additive 2), and an oxide containing Si and B as principal constituents represented by the formula $0.25Li_2O$-$0.30B_2O_3$-$0.03TiO_2$-$0.42SiO_2$, where the coefficients indicate molar ratios (hereinafter referred to as a sintering additive 3) were prepared by weighing oxides, carbonates or hydroxides of each constituent so as to satisfy the above formulae, followed by mixing and pulverizing, and then evaporation drying was performed to obtain a powder. The powder for each sintering additive was heated and melted at 1,300° C. in an alumina crucible, followed by quenching and pulverizing to obtain oxide glass powder as the sintering additive with an average particle size of 1 μm or less.

Next, the calcines previously obtained, $SiO_2$, and the sintering additives were weighed and mixed so as to obtain the composition represented by the formula $100BaTiO_3$-$3.0GdO_{3/2}$-$3.0CaO$-$5.0SiO_2$-{any one of sintering additives 1 to 3}, where the coefficients indicate moles, and the amount of the sintering additive was in parts by weight relative to 100 parts by weight of $BaTiO_3$, as shown in Table 3. The mixtures thus obtained corresponded to the composition of Sample No. 16 in Example 1 having the sintering additive added.

TABLE 3

| Sample No. | Amount added (parts by weight) | | |
|---|---|---|---|
| | Sintering additive 1 | Sintering additive 2 | Sintering additive 3 |
| 17 | 17.0 | 0 | 0 |
| 18 | 0 | 17.0 | 0 |
| 19 | 0 | 0 | 17.0 |
| 20 | 15.0 | 0 | 0 |
| 21 | 0 | 15.0 | 0 |
| 22 | 0 | 0 | 5.0 |
| 23 | 2.0 | 0 | 0 |

Next, by using the above mixtures, monolithic ceramic capacitors having the same structure as that in Example 1 were fabricated by the same method. In a manner similar to that in Example 1, the relative dielectric constant (ε), the dielectric loss (tan δ), the product CR, the change in capacitance with temperature and the average lifetime in the high-temperature load test were evaluated. The evaluation results are shown in Table 4.

TABLE 4

| Sample No. | Firing Temperature (° C.) | ε | tan δ (%) | Change in Capacitance with Temperature ΔC/C20 (%) | | Change in Capacitance with Temperature ΔC/C25 (%) | | Product CR (Ω · F) | Average lifetime (h) |
|---|---|---|---|---|---|---|---|---|---|
| | | | | −25° C. | +85° C. | −55° C. | 125° C. | | |
| 17 | 920 | 1650 | 1.3 | 0.3 | −6.5 | −2.2 | −12.5 | 13200 | 20 |
| 18 | 900 | 1550 | 1.2 | 0.4 | −7.2 | −2.6 | −12.3 | 14500 | 50 |
| 19 | 880 | 1720 | 1.4 | 0.5 | −7.0 | −2.7 | −12.8 | 14200 | 30 |
| 20 | 900 | 1740 | 1.3 | −1.0 | −6.8 | −2.6 | −12.5 | 12300 | 270 |
| 21 | 900 | 1690 | 1.4 | −0.8 | −6.5 | −2.2 | −12.9 | 13200 | 290 |
| 22 | 1020 | 2150 | 1.3 | −0.7 | −7.0 | −2.6 | −11.6 | 15200 | 360 |
| 23 | 1060 | 2210 | 1.2 | −0.6 | −6.8 | −2.7 | −10.4 | 17800 | 360 |

As is clear from the comparison between Sample No. 16 in Example 1 and Sample Nos. 20 to 23 shown in Table 4, by incorporating, as the sintering additive, an oxide containing at least one element selected from the group consisting of B and Si, the content of the oxide being about 15 parts by weight or less relative to 100 parts by weight of $BaTiO_3$, the firing temperature is decreased and the sinterability is improved.

EXAMPLE 3

In a manner similar to that in Example 1, $BaTiO_3$ was prepared. $Gd_2O_3$ and CaO were also prepared. The above powdered raw materials were mixed so as to satisfy the composition represented by the formula $100BaTiO_3$-$3.0GdO_{3/2}$-$3.0CaO$, where the coefficients indicate moles, and calcination was performed at 900 to 1,100° C. Pulverization was then performed so that the maximum particle size was 1 μm or less.

Next, $SiO_2$, MnO, ZnO, NiO, CoO and CuO were prepared, and together with the calcine previously obtained, were weighed and mixed so as to obtain the composition represented by the formula $100BaTiO_3$-$3.0GdO_{3/2}$-$3.0CaO$-$5.0SiO_2$-dMO, where the coefficients indicate moles, d is the value shown in Table 5, and M is the element shown in Table 5. The mixtures thus obtained corresponded to the composition of Sample No. 16 in Example 1 having MO added as the secondary constituent which was a compound containing at least one element selected from the group consisting of Mn, Zn, Ni, Co and Cu.

TABLE 5

| Sample No. | dMO | | | | | | Total d |
|---|---|---|---|---|---|---|---|
| | M | d | M | d | M | d | |
| 24 | Mn | 3.0 | Zn | 2.0 | Co | 2.0 | 7.0 |
| 25 | Ni | 4.0 | Zn | 2.5 | — | | 6.5 |
| 26 | Co | 4.0 | Cu | 3.0 | — | | 7.0 |
| 27 | Zn | 5.0 | Mn | 3.0 | — | | 8.0 |
| 28 | Mn | 5.0 | — | | — | | 5.0 |
| 29 | Mn | 1.0 | Co | 1.0 | — | | 2.0 |
| 30 | Mn | 1.0 | Zn | 0.5 | Cu | 2.0 | 3.5 |
| 31 | Ni | 1.0 | — | | — | | 1.0 |

Next, by using the above mixtures, monolithic ceramic capacitors having the same structure as that in Example 1 were fabricated in the same method. In a manner similar to that in Example 1, the relative dielectric constant (ε), the dielectric loss (tan δ), the product CR, the change in capacitance with temperature, and the average lifetime in the high-temperature load test were evaluated. The evaluation results are shown in Table 6.

TABLE 6

| Sample No. | Firing Temperature (° C.) | ε | tan δ (%) | Change in Capacitance with Temperature ΔC/C20 (%) | | Change in Capacitance with Temperature ΔC/C25 (%) | | Product CR (Ω · F) | Average lifetime (h) |
|---|---|---|---|---|---|---|---|---|---|
| | | | | −25° C. | +85° C. | −55° C. | 125° C. | | |
| 24 | 1280 | 1910 | 0.9 | 0.5 | −7.0 | −2.7 | −10.3 | 100 | 90 |
| 25 | 1260 | 1870 | 1.0 | −1.0 | −6.8 | −2.4 | −10.8 | 900 | 50 |
| 26 | 1280 | 1950 | 0.8 | −0.8 | −6.9 | −2.6 | −12.5 | 800 | 40 |
| 27 | 1280 | 1850 | 1.0 | −0.7 | −7.2 | −2.7 | −10.9 | 200 | 80 |
| 28 | 1240 | 2050 | 0.9 | −0.6 | −6.5 | −2.3 | −9.6 | 20200 | 360 |
| 29 | 1180 | 2160 | 0.9 | 0.0 | −7.0 | −2.2 | −10.4 | 21200 | 430 |
| 30 | 1200 | 2090 | 1.1 | 0.1 | −6.6 | −2.6 | −9.6 | 20300 | 350 |
| 31 | 1160 | 2100 | 1.1 | 0.0 | −7.0 | −2.7 | −11.2 | 21200 | 420 |

As is clear from the comparison between Sample No. 16 in Example 1 and Sample Nos. 28 to 31 shown in Table 6, by further incorporating, as the secondary constituent, a compound containing at least one element selected from the group consisting of Mn, Zn, Ni, Co and Cu, the content of the compound converted into MO, where M is at least one element selected from the group consisting of Mn, Zn, Ni, Co and Cu, being about 5.0 moles or less, the product CR is further increased.

EXAMPLE 4

In a manner similar to that in Example 1, $BaTiO_3$ was prepared. $Gd_2O_3$ and CaO were also prepared. The above powdered raw materials were mixed so as to satisfy the composition represented by the formula $100BaTiO_3$-$3.0GdO_{3/2}$-$3.0CaO$, where the coefficients indicate moles, and calcination was performed at 900 to 1,100° C. Pulverization was then performed so that the maximum particle size was 1 μm or less.

Next, $SiO_2$ was prepared. As the compound containing at least one element selected from the group consisting of Ba, Ca and Sr and at least one element selected from the group consisting of Zr and Hf, which was represented as $XYO_3$, where X is at least one element selected from the group consisting of Ba, Ca and Sr, and Y is at least one element selected from the group consisting of Zr and Hf, $CaZrO_3$, $SrZrO_3$, $BaZrO_3$, and $CaHfO_3$ were prepared.

Next, the calcine previously obtained, $SiO_2$, and the compound $XYO_3$ were weighed and mixed so as to obtain the composition represented by the formula $100BaTiO_3$-$3.0GdO_{3/2}$-$3.0CaO$-$5.0SiO_2$-$eXYO_3$, where the coefficients indicate moles, the value of e and the composition of $XYO_3$ are in Table 7. The mixtures thus obtained corresponded to the composition of Sample No. 16 in Example 1 having the compound added as the secondary constituent which contained at least one element selected from the group consisting of Ba, Ca, and Sr and at least one element selected from the group consisting of Zr and Hf.

TABLE 7

| Sample No. | $CaZrO_3$ | $SrZrO_3$ | $BaZrO_3$ | $CaHfO_3$ | $SrHfO_3$ | $BaHfO_3$ | Total e |
|---|---|---|---|---|---|---|---|
| 32 | 9.5 | 24.5 | 0 | 0.5 | 0.5 | 0 | 35.0 |
| 33 | 33.0 | 0 | 0 | 0 | 0 | 0 | 33.0 |
| 34 | 0 | 2.0 | 32.0 | 0 | 0 | 1.0 | 35.0 |
| 35 | 2.5 | 15.0 | 16.0 | 0.5 | 0 | 0 | 34.0 |
| 36 | 4.0 | 0 | 25.0 | 0 | 0 | 1.0 | 30.0 |
| 37 | 9.0 | 7.0 | 0 | 0 | 1.0 | 0 | 17.0 |
| 38 | 0 | 1.0 | 2.5 | 0 | 0 | 0.5 | 4.0 |
| 39 | 0 | 0 | 2.0 | 0 | 0 | 0 | 2.0 |

Next, by using the above mixtures, monolithic ceramic capacitors having the same structure as that in Example 1 were fabricated in the same method. In a manner similar to that in Example 1, the relative dielectric constant (ε), the dielectric loss (tan δ), the product CR, the change in capacitance with temperature, and the average lifetime in the high-temperature load test were evaluated. The evaluation results are shown in Table 8.

TABLE 8

| Sample No. | Firing Temperature (° C.) | ε | tan δ (%) | Change in Capacitance with Temperature ΔC/C20 (%) | | Change in Capacitance with Temperature ΔC/C25 (%) | | Product CR (Ω · F) | Average lifetime (h) |
|---|---|---|---|---|---|---|---|---|---|
| | | | | −25° C. | +85° C. | −55° C. | 125° C. | | |
| 32 | 1380 | 2310 | 1.2 | −0.3 | −8.8 | −2.7 | −16.1 | 32400 | 500 |
| 33 | 1380 | 2210 | 1.3 | −0.2 | −8.9 | −2.4 | −17.1 | 36600 | 530 |
| 34 | 1380 | 2100 | 1.2 | 0.0 | −9.2 | −2.5 | −18.0 | 20600 | 570 |
| 35 | 1380 | 2220 | 1.5 | 0.1 | −8.5 | −2.3 | −18.3 | 26800 | 650 |
| 36 | 1280 | 2290 | 1.4 | 0.2 | −8.2 | −2.2 | −13.8 | 28300 | 500 |
| 37 | 1240 | 2380 | 1.3 | 0.3 | −8.0 | −2.6 | −13.3 | 27000 | 560 |
| 38 | 1200 | 2560 | 1.5 | −0.1 | −7.8 | −2.7 | −12.1 | 25800 | 550 |
| 39 | 1180 | 2500 | 1.2 | 0.0 | −7.5 | −2.4 | −11.1 | 22500 | 660 |

As is clear from the comparison between Sample No. 16 in Example 1 and Sample Nos. 36 to 39 shown in Table 8, by further incorporating, as the secondary constituent, the compound containing at least one element selected from the group consisting of Ba, Ca and Sr and at least one element selected from the group consisting of Zr and Hf, the content of the compound converted into $XYO_3$, where X is at least one element selected from the group consisting of Ba Ca, and Sr, and Y is at least one element selected from the group consisting of Zr and Hf, being about 30 moles or less, the product CR is increased and the average lifetime is increased, thus improving reliability.

Additionally, although $BaTiO_3$ is described as barium titanate in the examples described above, in the barium titanate of the present invention represented by $Ba_mTiO_3$, m which indicates the ratio of Ba to Ti is limited to the relationship $0.990 \leq m \leq 1.030$. Within the above range, the same advantages as those described in the individual examples are obtained. In contrast, when m is equal to or less than about 0.990, since the grain growth is accelerated, temperature characteristics are deteriorated. When m is greater than about 1.030, the density decreases due to greenness unless the firing temperature is increased.

With respect to the dielectric ceramic compositions within the range of the present invention obtained in the individual examples, the average grain size was 1 µm or less.

In the examples described above, although barium titanate was formed by a method using oxalic acid, the barium titanate in the present invention is not limited to this, barium titanate formed by an alkoxide method or hydrothermal synthesis may be used.

In the barium titanate as the principal ingredient, for example, alkaline-earth oxides, such as SrO and CaO, alkali metal oxides, such as $Na_2O$ and $K_2O$, and $Al_2O_3$, are present as impurities, and among them, it is confirmed that the content of the alkali metal oxides, such as $Na_2O$ and $K_2O$, greatly influences electrical characteristics. Therefore, in order to avoid the deterioration of the electrical characteristics, preferably, the barium titanate containing less than about 0.02% by weight of alkali metal oxides is used.

In the examples described above, although oxides, such as $Y_2O_3$, $Sm_2O_3$, $Eu_2O_3$, CaO and $SiO_2$, are used as materials for secondary constituents, carbonates, alkoxides, or organic metals may be used instead of the oxides.

Additionally, the dielectric ceramic composition of the present invention may further contain one element selected from the group consisting of V, W, Nb, and Ta as a secondary constituent to form a compound oxide, the content of the above element converted into an oxide being about 5 moles or less relative to 100 moles of barium titanate.

As described above, in the dielectric ceramic composition of the present invention, the change in capacitance with temperature satisfies the B-level characteristic stipulated in the JIS and the X7R-level characteristic stipulated in the EIA standard, and temperature characteristics are flat. Therefore, the monolithic ceramic capacitor having dielectric ceramic layers composed of the above dielectric ceramic composition can be used in any electronic apparatus which is operated in an environment where temperature greatly varies.

The dielectric ceramic composition of the present invention has an average grain size that is as small as 1 µm or less, a dielectric loss that is as low as 2.5% or less, has a product CR of 10,000 Ω·F or more at room temperature in the presence of an applied DC electric field of 4 kV/mm, and is highly reliable even if the thickness of the layers is reduced because the insulation resistance has a long acceleration life at high temperatures and high voltages. Therefore, it is possible to reduce the size of and increase the capacitance of the capacitor by reducing the thickness of dielectric ceramic layers, and also it is not necessary to decrease the rated voltage even if the thickness of the layers is reduced. That is, a miniaturized monolithic ceramic capacitor having a large capacitance in which the thickness of dielectric layers is reduced, for example, to 5 µm or less can be obtained.

What is claimed is:

1. A dielectric ceramic composition comprising:
   a barium titanate;
   a rare-earth oxide in which the rare-earth element R is at least one element selected from the group consisting of Y, Sm, Eu, Gd, Tb, Dy, Ho, Er, Tm and Yb;
   a calcium oxide; and
   a silicon oxide,
   wherein the dielectric ceramic composition is represented by the formula $100Ba_mTiO_3 + aRO_{3/2} + bCaO + cSiO_2$, in which coefficients 100, a, b, and c indicate moles, and m, a, b and c satisfy the relationships $0.990 \leq m \leq 1.030$, $0.5 \leq a \leq 30$, $0.5 \leq b \leq 30$ and $0.5 \leq c \leq 30$, respectively.

2. A dielectric ceramic composition according to claim 1, further comprising, as a sintering additive, an oxide of at least one element selected from the group consisting of B and Si, the content of said oxide being about 15 parts by weight or less relative to 100 parts by weight of $Ba_mTiO_3$.

3. A dielectric ceramic composition according to claim 2, further comprising, as a secondary constituent, a compound of at least one element M selected from the group consisting of Mn, Zn, Ni, Co and Cu, the content of said compound converted into MO being about 5.0 moles or less.

4. A dielectric ceramic composition according to claim 3, further comprising, as a secondary constituent, a compound of at least one element X selected from the group consisting of Ba, Ca and Sr and at least one element Y selected from the group consisting of Zr and Hf, the content of the compound converted into $XYO_3$ being about 30 moles or less.

5. A dielectric ceramic composition according to claim 2, further comprising, as a secondary constituent, a compound of at least one element X selected from the group consisting of Ba, Ca and Sr and at least one element Y selected from the group consisting of Zr and Hf, the content of the compound converted into $XYO_3$ being about 30 moles or less.

6. A dielectric ceramic composition according to claim 1, further comprising, as a secondary constituent, a compound of at least one element X selected from the group consisting of Ba, Ca and Sr and at least one element Y selected from the group consisting of Zr and Hf, the content of the compound converted into $XYO_3$ being about 30 moles or less.

7. A dielectric ceramic composition according to claim 1, further comprising, as a secondary constituent, a compound of at least one element M selected from the group consisting of Mn, Zn, Ni, Co and Cu, the content of said compound converted into MO being about 5.0 moles or less.

8. A dielectric ceramic composition according to claim 7, wherein M is at least two members of said group.

9. A dielectric ceramic composition according to claim 1, wherein R is at least two members of said group.

10. A monolithic ceramic capacitor comprising:
    a plurality of dielectric ceramic layers;
    a plurality of internal electrodes each of which is disposed between adjacent dielectric ceramic layers; and
    external electrodes electrically connected to the internal electrodes,
    wherein the dielectric ceramic layers comprise a dielectric ceramic composition according to claim 7 and wherein the internal electrodes comprise a base metal.

11. A monolithic ceramic capacitor according to claim 10, wherein said base metal comprises nickel.

12. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 6 and wherein the internal electrodes comprise a base metal.

13. A monolithic ceramic capacitor according to claim 12, wherein said base metal comprises nickel.

14. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 5 and wherein the internal electrodes comprise a base metal.

15. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 4 and wherein the internal electrodes comprise a base metal.

16. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 3 and wherein the internal electrodes comprise a base metal.

17. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 2 and wherein the internal electrodes comprise a base metal.

18. A monolithic ceramic capacitor according to claim 17, wherein said base metal comprises nickel.

19. A monolithic ceramic capacitor comprising:

a plurality of dielectric ceramic layers;

a plurality of internal electrodes each of which is disposed between adjacent dielectric ceramic layers; and external electrodes electrically connected to the internal electrodes, wherein the dielectric ceramic layers comprise a dielectric ceramic composition according to claim 1 and wherein the internal electrodes comprise a base metal.

20. A monolithic ceramic capacitor according to claim 19, wherein said base metal comprises nickel.

* * * * *